US009292374B2

(12) United States Patent
Fabbrocino

(10) Patent No.: US 9,292,374 B2
(45) Date of Patent: *Mar. 22, 2016

(54) SYSTEM AND METHOD FOR AUTOMATICALLY UPLOADING ANALYSIS DATA FOR CUSTOMER SUPPORT

(75) Inventor: Frank Fabbrocino, Los Angeles, CA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,302

(22) Filed: Jun. 21, 2011

(65) Prior Publication Data
US 2011/0252269 A1    Oct. 13, 2011

Related U.S. Application Data

(63) Continuation of application No. 11/080,599, filed on Mar. 14, 2005, now Pat. No. 7,968,522.

(51) Int. Cl.
*G06F 11/07*    (2006.01)
(52) U.S. Cl.
CPC ........ *G06F 11/0793* (2013.01); *G06F 11/0742* (2013.01)
(58) Field of Classification Search
CPC ............ G06F 11/0709; G06F 11/1466; G06F 11/1469; G06F 11/0751
USPC ........................................................ 714/26
See application file for complete search history.

(56) References Cited

U.S. PATENT DOCUMENTS

| 6,219,693 | B1* | 4/2001 | Napolitano et al. | 709/203 |
| 2002/0083164 | A1* | 6/2002 | Katayama et al. | 709/223 |
| 2004/0128583 | A1* | 7/2004 | Iulo et al. | 714/25 |

FOREIGN PATENT DOCUMENTS

WO    2006/088193    8/2006

OTHER PUBLICATIONS

Northrup Tony, "Using Microsoft Online Crash Analysis", Oct. 6, 2003, Microsoft, http://www.microsoft.com/windowsxp/using/setup/expert/northrup_03october06.mspx.
"Privacy Statement for the Microsoft Error Reporting Service", http://oca.microsoft.com/en/dcp20.asp, Oct. 10, 2005.
"Microsoft Online Crash Analysis", https://oca.microsoft.com/en/Welcome.aspx, Oct. 6, 2003.

* cited by examiner

*Primary Examiner* — Jigar Patel
(74) *Attorney, Agent, or Firm* — K&L Gates LLP

(57) ABSTRACT

The invention enhances automatic incident control, problem control, and problem prevention using information provided by the analysis or analysis data. The burden on the part of both users and providers to resolve problems is reduced by using a method of automatic analysis data upload and intelligent problem analysis and resolution. Problems are better identified, investigated, diagnosed, recorded, classified, and tracked until affected services return to normal operation and errors trends are used to proactively prevent future problems.

42 Claims, 4 Drawing Sheets

SYSTEM AND METHOD FOR AUTOMATICALLY UPLOADING ANALYSIS DATA FOR CUSTOMER SUPPORT

PRIORITY CLAIM AND CROSS-REFERENCE TO A RELATED APPLICATION

This application is a continuation of application Ser. No. 11/080,599 filed on Mar. 14, 2005. This application claims priority to said application under 35 U.S.C. §120. The entire contents of the original disclosure of said application is expressly incorporated herein in its entirety by reference thereto.

FIELD OF THE INVENTION

The invention relates to the electronic transfer of analysis data used to diagnose system errors. The analysis data is compiled in multiple forms.

BACKGROUND OF THE INVENTION

Networks operate between a number of computers to transfer information between a provider and a user. However, communications between the providers and users that selectively interact with each other are prone to problems involving hardware, software, and user error. Such problems commonly occur in e-commerce, messaging, application hosting, or knowledge management. Various approaches are used to manage problems in order to minimize the ill-effects of service disruption between Servers and Clients.

One conventional approach to problem management includes the provider providing a "help desk" that may or may not be staffed with a person providing live assistance. This approach requires the user to identify that there is a problem and contact the provider help desk. Once contact is made, the user must describe the problem and provide information to the provider regarding the client's hardware, software, and operating status. Often a user does not know how to identify or to explain what is causing the problem or how to begin going about fixing the problem. This method of problem management requires heavy involvement of time, energy, expense, and even annoyance of both the user and provider as both parties must verbalize the electronic malfunction and solutions.

Another conventional method for problem management is the provider's supplying software updates on CD-ROMS or diskettes that the user can upload onto the system. Providers typically send updates to all known users of using their software. Provider updates by mail, email, or by download is expensive and inefficient as not every user is desirous of the update nor will install it. Further, the user must have some knowledge, time, and effort to successfully install the updates.

Another problem management method known in the art is the provision of software updates in electronic "patches," or bundles of new computer code, that overwrite or replace improperly functioning code. Patches may be provided on-line through the Internet or in the form of hardware updates discussed above.

Patches are used to preemptively treat specific problems or possible problems manifesting from errors. The implementation of patch computer code may be embedded as an automatic function in the underlying software such that any updates delivered from the provider are automatically incorporated into the user's software program. Alternatively, implementation of patch code requires the user to selectively incorporate the patch computer code. In this instance, the user is notified that a new patch is available, questioned as to whether they would like to download the patch, and then the user is prompted to download the new computer code.

However, there are several limitations related to the use of patch technology. Patches only treat problems already known by the provider. Patches do not address hardware or error specific to a particular user. Further, patches do not provide an immediate fix for those users first encountering problems that lead to the creation of patches; hence, users encounter longer waits for solutions to those problems that is resolved by patches.

In addition to handling individual problems, conventional problem management often involves the collection of information during problem resolution to be used by providers to reduce the impact, recurrence, and to correct the underlying causes of the problems. Providers traditionally compile information gathered from customer service representatives and other customer response mechanisms to mitigate problem occurrence.

SUMMARY OF THE INVENTION

The present invention relates to an improved method for problem management and resolution between providers and users. The present invention is a method and apparatus for providing users with a method of uploading analysis data to a central analysis data database for use in problem management and/or resolution. The systems and method support the provision of specific service solutions, and eliminates many of the difficulties involved in conventional problem management. The system and method assist users with compressing and emailing analysis data, as well as with sharing and retrieving data files. Users are automatically enabled or selectively enabled to upload analysis data to a server at the discretion of either the user or the provider. The present invention enables providers to automatically collect and compare error data useful in improving the provider's service by enhancing the ability to detect and forecast problems, thereby enhancing the workability of their product.

The method includes one or more steps. Users select or are prompted to upload analysis data when the user, client, provider or server detects a problem. The analysis data is uploaded to the server with or without the knowledge of the user. In an embodiment, the analysis data are transmitted transparently between the user and the provider. The transparent transmission takes place without the user being aware that the files are being transferred. In an embodiment, the user may start the analysis data capture but all other features are not made known to the user, including the status of gathering the analysis data and the transmission of the analysis data to the server. Initiating the analysis data capture can also be performed by the provider and the user can be completely unaware that any gathering and transmission of data is taking place.

Analysis data can be stored or reside on one or more servers and the servers can be used to diagnose and treat problems.

The method for problem management includes, identifying the problem, capturing the pertinent analysis data to be used in resolution of that problem, sending analysis data to the server, organizing analysis data so that it can be easily accessed and analyzed, maintaining analysis data so that clients' analysis data is compared or studied, analyzing analysis data via automated computer programs or human intervention, and responding to client problems and/or user concerns.

Analysis data can consist of data recorded during the operation of one or both the user's client or device and the provider's service. The analysis data contains usage data, performance data, errors, warnings, and operational information. Analysis data can be written to files or databases, either in a standard format or a proprietary format. Analysis data can also include a history of what happened to a user's hardware and/or software, a provider's server, server network, and/or software or the communication between the two including bandwidth status between both the provider's servers and the provider and the user. Log files are one way to detect and trace an intrusion by a hacker, trace the reason behind a server failure, gather data for capacity planning, or determine which network sites were visited by the user.

The method of automatically uploading analysis data according to preset user preferences provides several benefits over conventional methods of problem management and resolution. Users have greater control over computer functionality and providers have a method of providing users with either automatic or live customer service with reduced or no intrusion into users' time, energy, or computer resources.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF EMBODIMENTS

The system and method assist in problem management and resolution encompassing many types of problems and errors. In addition to problems typically dealt with using conventional problem management methods, the system can automatically diagnose problems arising from incompatibility of programs maintained on a user's device, and problems attributable to the disruptions in the routine transmission of electronic information. Problems redressed using the system arise from user error, or hardware, software, electrical, weather, satellite, or network, including the Internet, connection problems.

Figure 1:
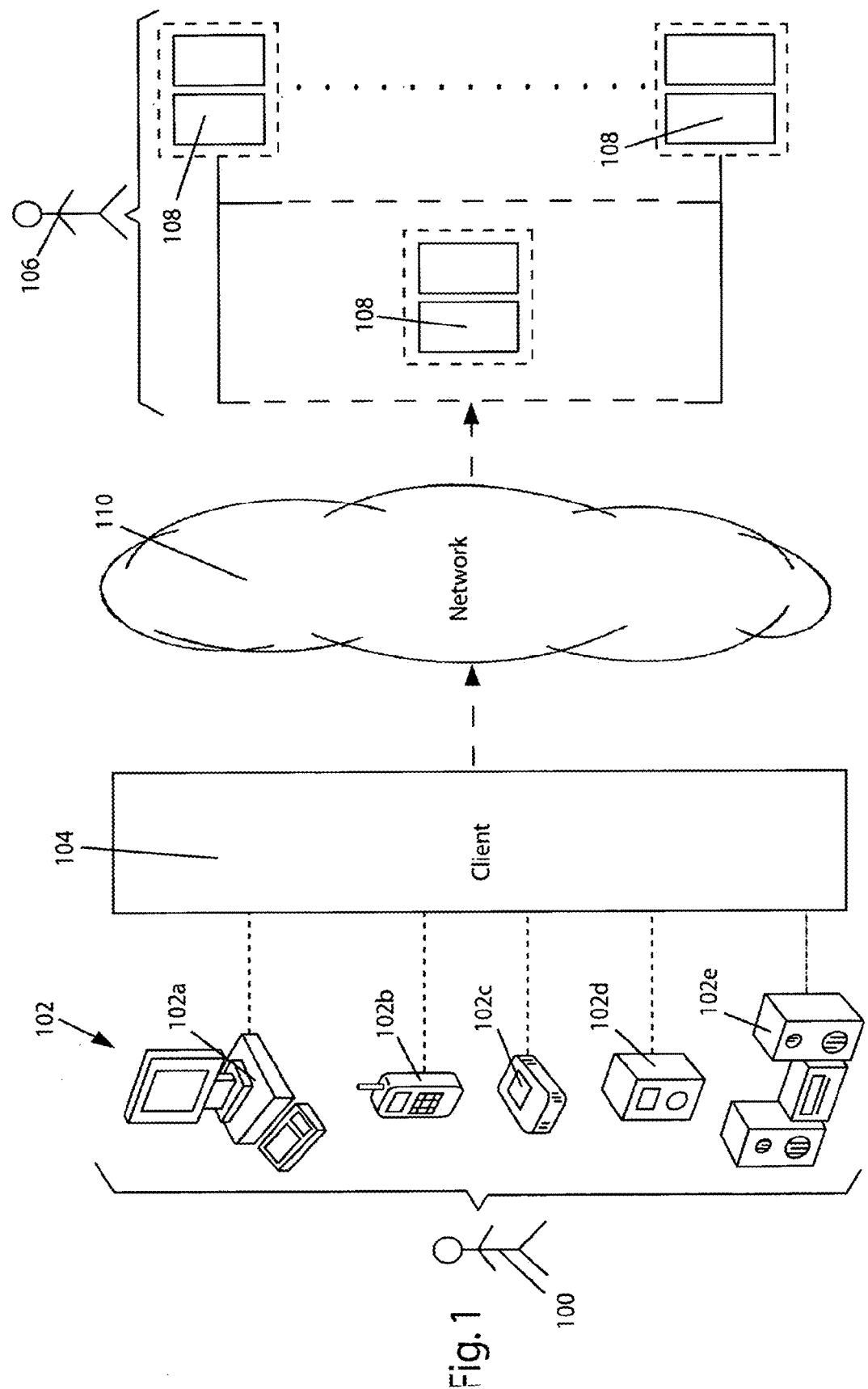
FIG. 1 is a diagram of the present invention.

FIG. 1 illustrates a basic system of the present invention. A user 100 utilizes a device 102 connected over a network 104 to a provider's 106 system, typically including one or more servers 108. The user's devices 102 can include a computer 102a, a cellular telephone 102b, a PDA/pager/Blackberry 102c, an portable media player 102d, or entertainment device 102e, including stereos, DVD/VHS players, game systems (e.g. PS2®, X-Box®) or any networked device both stationary or portable. User device 102 can, in one embodiment, run a client 104 which can be the software allowing the user 100 to access sever 108. The user 100 can connect to the network 110 using any method known in the art, including telephone, DSL, cable, wireless and satellite. Network 110 can be a LAN, WAN and/or include the Internet. The provider's 106 system can include one or more servers 108 to run the service accessed by user 100, and store and analyze analysis data. The provider 106 can distribute the functionally, across multiple servers, each server handling one of more specific tasks, or each server handling all tasks.

Figure 2:
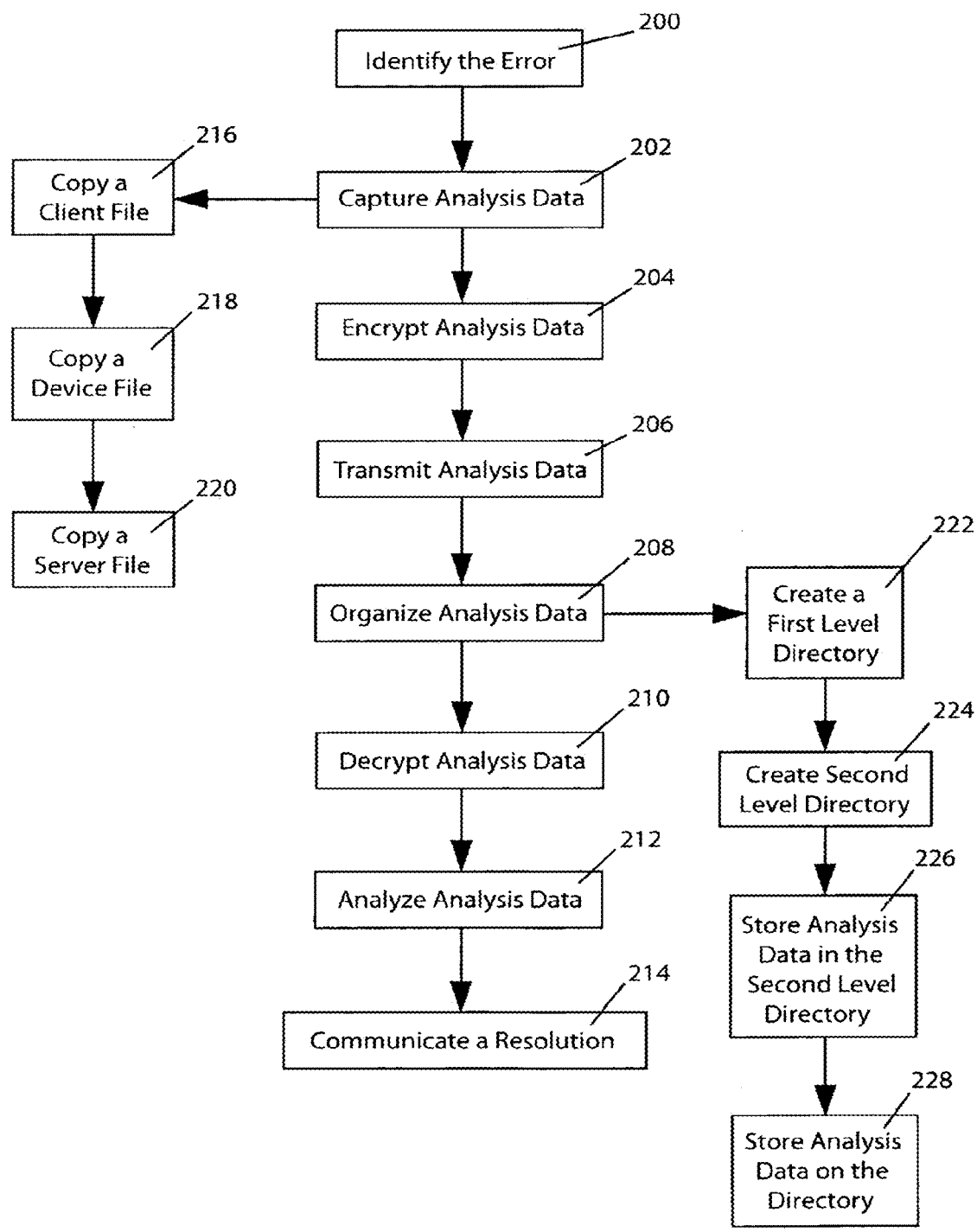
FIG. 2 is a flow chart of an embodiment of a method of the present invention.

FIG. 2 illustrates a flow chart of a method of error management and resolution. The method for resolving an error on a user device includes the steps of identifying the error on the user device (step 200). The user device 102 can be one or more of the devices described above. Also, the identifying step can include the server 108 identifying the error on the user device 102. In this embodiment, the server 108 is monitoring the status of the client 104 and/or device 102 and if the server 108 notices instabilities that could lead to an error or an error itself, it can initiate the error correction procedure.

Another step is the capturing step (step 202) which can include the steps of copying a client file 302 from the user device 102 (step 216), copying a device file 304 from the user device 102 (step 218), and copying a server file 306 (step 220).

Figure 3:
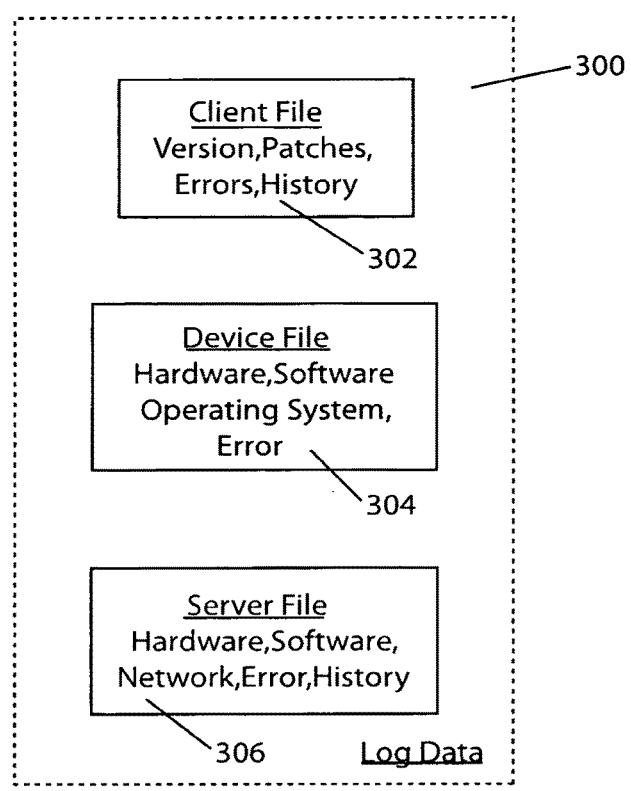
FIG. 3 is a diagram illustrating an embodiment of analysis data of the present invention.

Analysis data 300, as illustrated in FIG. 3, can include many different types of files and data. In one embodiment, a client file 302 contains information regarding the client error, the client software and the user's 100 use of the client software, including the version of the software, any updates or patches, and a history of usage, including times the client is active and sites within the provider's 106 system that the user 100 frequents.

Analysis data 300 can also contain device file 304. Device file 304 can contain all the information related to the user device 102, including a listing of the hardware associated with the device 102 (e.g. memory capacity and allocation, drives, communication devices, printers, wireless links, peripherals, CPU usage), the software associated with the device 102 includes the operating systems, internet browser, media player, burning utility and all other programs. Device file 304 can also include data relating to any device errors occurring concurrent with the client error or within a predetermined period prior to the client error.

Analysis data 300, in an embodiment, can include a server file 306 that contains all the information pertaining to the server 108 that the user 100 encountered the error on and/or the server 108 the user 100 is communicating the error to. Server file 306 can contain hardware and software information present on the server 108, any hardware or software server errors the server 108 encountered contemporaneously with the client error or within a predetermined period surrounding the client error. Further, the server file 306 can contain information related to communication over the network between the server 108 and the device 102 or between servers 108, or both, including available bandwidth, network usage, and upload/download bit rates, active ports, etc. A user's 100 history of usage can also be included in the server file 306, this can be in addition to or instead of the history provided in the client file 302.

Analysis data 300 in general contains usage data, performance data, errors, warnings, burn engine logs, DRM files, snap logs, installer logs, and operational information. Analysis data 300 is preferably written to files or databases in a standard format. However, a proprietary format can also used. In an embodiment, the analysis data 300 can be taken as a "snapshot" of the client 104, device 102 and/or server 108 files contemporaneous with the client error.

Alternately, or in addition to, the client 104 and/or the server 108 maintains rolling analysis data. Analysis data 300 can be recorded continuously and then older data is erased as new information continues to be entered. In another embodiment, the analysis data 300 is collected and deleted at set intervals. For example, separate, new files are created containing the log entries for a given time period, every hour, every day, every week, every month, etc. Other embodiments delete older log entries when the log file reaches its maximum size or wraparound. Regardless of the embodiment employed, using a set logging policy ensures a consistent and accurate capturing methodology. The system can be preset to capture analysis data 300 in particular ways and/or set to a user preference based on processing speed, frequency of use and storage capacity. Further, the capturing step (step 202) can be dynamic, capturing different elements of the analysis data 300 using different capture embodiments depending on actual use of the device and/or client.

Returning to FIG. 2, another step can be encrypting the analysis data (step 204). The analysis data 300 is encrypted, in one embodiment, prior to transmitting the analysis data 300 to server 108. Encryption can also include compressing the analysis data 300 using standard compression algorithms. In one embodiment, analysis data 300 can be encrypted using encryption protocol established by the server 108. In another embodiment, the analysis data 300 can be encrypted using an encryption protocol determined by the client 104 or the user 100. The server 108 is then provided with a key to decrypt the analysis data 300.

Another step is transmitting the analysis data 300 to server 108 (step 206). In one embodiment, problems can be automatically detected by the server 108 or client 104 and analysis data 300 can be transmitted to the server 108 without any action or knowledge on the part of the user 100. In another embodiment, user 100 identifies a problem, error or concern and transmits analysis data 300. In this instance, the user 100 can select which analysis data 300 to transmit (client file 302, device file 304 and/or server file 306 or portions thereof) and uploads them to the server 108. Alternatively, the analysis data 300 may be automatically prepared and transmitted to the server 108 under the direction of the user 100. In one embodiment, the server 108 displays to the user 100 a modal dialog with a progress bar indicating the progress of the transmission.

Analysis data 300 is typically transmitted to the server 108 via a network connection 110, for example, over the Internet. The transmission to the server 108 can be set to occur immediately upon acknowledgement of a problem, or at such other time as designated by the user 100.

In an embodiment, transmitted analysis data 300 can include everything in a designated directory. Client 302 and device 304 files can be stored locally on device 102 or stored remotely on external memory or another device. For example, if the user device 102 has a small onboard memory for analysis data storage, for example, portable media player 102d, the analysis data 300 can be stored on computer 102a and transmitted from computer 102a to server 108. Analysis data 300 on user device 102 can be synchronized with the storage device either at regular intervals or whenever the user device 102 and storage device are in communication.

A further embodiment can transmit analysis data 300 for every device 102 to server 108 once an error is detected on any device 102. Alternately, analysis data 300 for related devices 102 can be transmitted once an error is detected on either device 102. For example, an error can occur on portable media player 102d and analysis data 300 for both portable media player 102d and computer 102a that typically stores analysis data 300 for, or synchronizes with, portable media player 102d.

Accuracy can be an important factor. In one embodiment, a file format for the upload is a CAB file because the API is standard on Windows platforms and another format requires a compression and packaging library to be added to the client. However, other file formats are also used.

In an embodiment, the user 100 transmits analysis data 300 to the server 108 using a standard HTTP PUT, with the packaged file as the PUT data. HTTPS is not required since the post data is encrypted.

Figure 4:
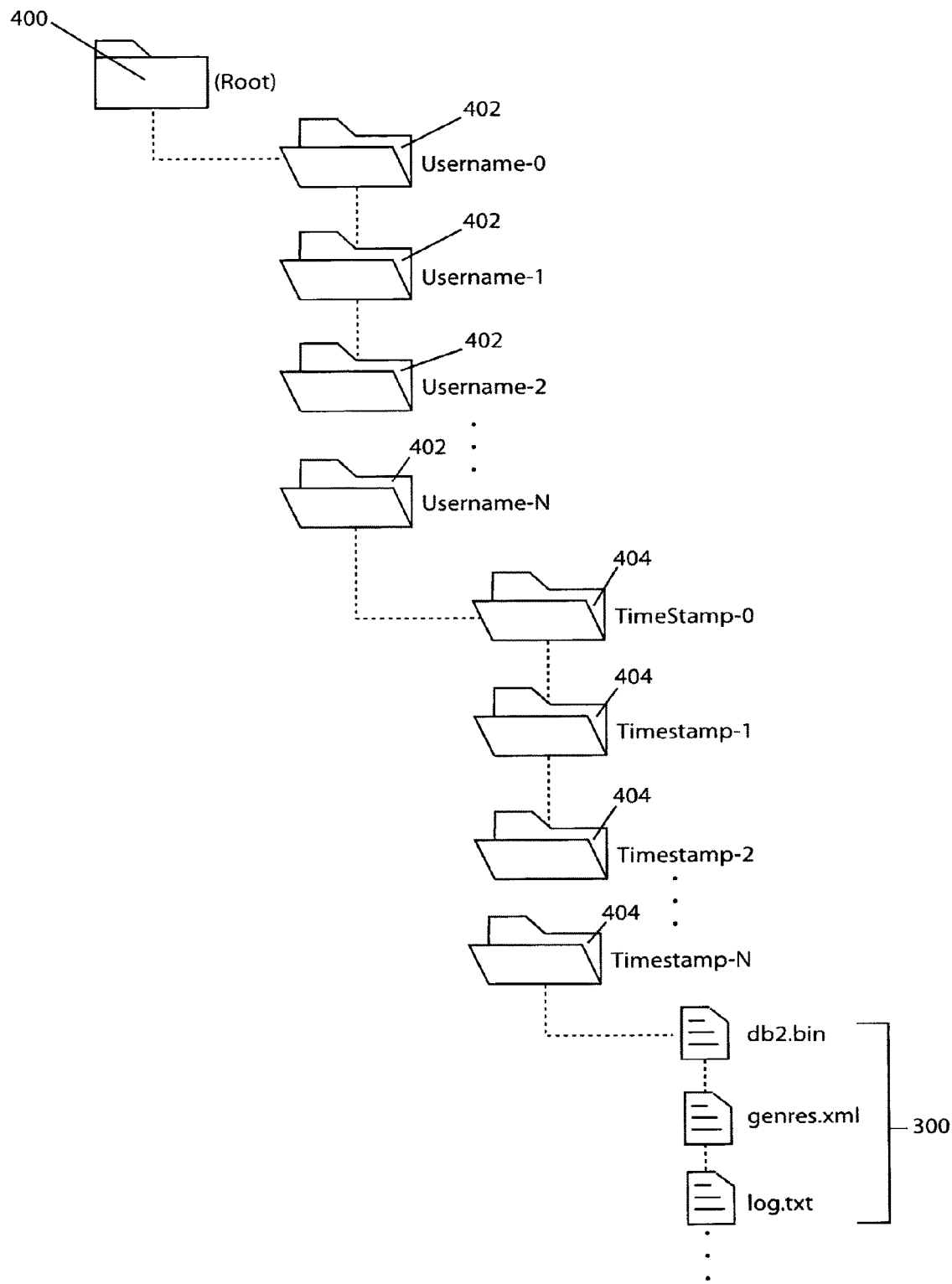
FIG. 4 is a diagram of an embodiment of the directory structure of the present invention.

Analysis data 300 received by server 108 can be organized for storage (step 208). Organization can include the steps of creating a first level directory 402 (step 222), a second level directory 404 under the first level directory 402 (step 224), and storing the analysis data 300 (step 226). FIG. 4 illustrates one embodiment of the storage structure. Alternately, the second level directory can be a hyperlink directing the provider 106 to the analysis data 300 stored elsewhere, including on the user device 102.

The directory of transmitted analysis data can be used to address problems on an individual basis or shared problems on a collective basis. In an embodiment, the directory structure is based on a first level directory 402 under a root directory 400 using the user's name and contact information. The second level directory 404 can use a timestamp of the transmission or receipt of the transmission. The analysis data 300 can be stored under the second level directory 404. The timestamp permits separation of multiple uploads from the same user 100 and facilitates tracking of problem solving efficiency. Separating analysis data 300 by user name simplifies access and retrieval.

The directory structure operates to facilitate both identification of the user 100 and/or client 104, resolution of the problem encountered by the user 100 and/or client 104 and identification of problems shared by multiple users/clients occurring close together in time. The directory identifies the contact information of the user and can notify the provider 106 and/or the user 100 that the user 100 is having a problem and provides the contact information of parties whether notified or not. In another embodiment, the provider 106 is only notified of a client problem when that problem is not fixed automatically by the server 108 and/or when the problem requires human intervention.

The information stored in the directory is searched to identify recurring problem types, seriousness, and frequency. The information gathered from the directory is used to target treatment of the specific problem encountered by any specific user, to treat any problem shared by a class of users, or to take preemptive action by creating and making available patches or updates.

In an embodiment, any analysis data 300 sent to the server 108 is copied and stored on the user device 102 (step 228) until such time as the problem is resolved. Thus, one embodiment is that copies of the client file 302 and the device file 304 are copied and a copy of the server file 306 is transmitted to the device 102. Saving a copy of the analysis data 300 to the user device 102 can be a security measure to ensure that the server 108 receives the analysis data 300 for problem analysis. In the event that the first attempt to transmit analysis data 300 to the server 108 is not successful, the client 104 either automatically, or under the direction of the user 100, makes repeated attempts to send analysis data 300 to the server 108. Upon resolution of the problem, the copied analysis data 300 on the user device 102 can be either deleted or saved, either automatically by the client 104, or by selection of the user 100. In another embodiment, transferred analysis data is not stored on the user device 102.

In the embodiment where analysis data 300 was encrypted (step 204) the server 108 can decrypt the analysis data 300 (step 210). Decryption can also include decompression of the analysis data 300. The analysis data 300 can be stored on server 108 encrypted and/or compressed and decrypted/decompressed prior to analysis. Alternately, the analysis data 300 can be decrypted and/or decompressed prior to storage. The server 108 can be automated so that any analysis data 300 received are unpackaged and decrypted, if necessary.

The analysis data 300 is analyzed to determine the problem (step 212). The underlying problem or error may be automatically diagnosed by the server 108 and fixed without human assistance, with or without the knowledge of the user 100 and/or provider 106. This embodiment is fully transparent and no human party is aware of the diagnosis and repair. In another embodiment, the server 108 undertakes to resolve the problems encountered by client 104/user 100 as outlined in log data 300. If no solution is forthcoming, the server 108 notifies the provider 106 and/or the client 104/user 100 that further contact or diagnosis beyond the initial analysis data 300 is necessary to resolve the problem.

In another embodiment, the diagnosis of the underlying problem is undertaken by a third party acting on behalf of the provider 106, with or without notice provided to the user 100. The third-party can be another server 108 or provider 106, such as a customer service representative.

Access to the analysis data 300 is restricted to use for legitimate purposes only. In an embodiment, the server does not undertake to resolve the problem, but merely organizes and maintains log files. The analysis data 300 stored by the server is analyzed by the third party, and notice may not be provided to the user 100. Access to the server can be restricted to only intended third-party recipients. The server 108 can be protected when the analysis data 300 is stored decrypted. Protections can include either using an authentication protocol, restricting it to the internal IPs, or another method.

In an embodiment, users' problems are managed by the server and the provider without any input from the user. The problem is diagnosed and the solution is directly implemented. The problem is diagnosed using a computer program stored on or implemented by the server 108. User 100 may or may not be aware that their computer had a problem and is being, or has been serviced.

In the event that the server 108 is unable to resolve the problem automatically and requires only assistance on the part of the user 100, the user 100 is notified as to steps to take to either resolve or mitigate a problem. The provider 106 can also be notified as to any problem and directions provided to the user 100 by the server 108.

In another embodiment, in the event that the server is unable to resolve the problem automatically and requires only assistance on the part of the provider 106, the provider 106 or a representative of the provider 106 is notified and acts to resolve the problem using the analysis data 300 on the server 108. In this instance, user 100 may or may not be notified of the problem being resolved by the provider 106.

In a further embodiment, user 100 is aware of a problem, and log data 300 is either automatically transmitted or actively transmitted by the user 100 to the server 108. As above, the server 108 either automatically resolves the problem and/or the provider 106 provides further assistance, if necessary. Notice to the user 100 regarding resolution of the problem is optionally provided.

Once the analysis is performed, a resolution to the error, based on the analysis of the analysis data 300, is communicated to the user (step 214). The resolution can be instructions to reboot the system, information regarding conflicting software, notification and/or the purging of a virus, a client upgrade or patch, a link to a third party software provider to upgrade other software present on the user device 102 or notification that the error was caused by the provider or a third party.

The resolution of the error and/or problem can include providing appropriate patches, notification of appropriate hardware or software, instructions to the user regarding any steps to take in order to resolve the problem, notification to the user to contact the provider for live assistance with or without the provider's contact information, notification to the user of any problems resolved, notification to the provider to undertake analysis of problems not capable of resolution by the server, notification to the provider to contact the user, with or without the user's contact information, and notification to the user and/or the provider of any systemic or network failure not attributable to either the client or the provider.

Embodiments of the invention include, the server 108 processing the transmission by decompressing and/or decrypting the analysis data 300. The analysis data 300 is stored into a directory structure that facilitates identification, analysis and comparison of the analysis data 300. The server 108 can be accessed by the provider 106 to retrieve the analysis data 300. The analysis data 300 can alternately be accessed by the user 100, the provider 106 or a third party. Third party access to the analysis data requires rights to access the information for legitimate purposes.

Analysis data 300 can be maintained to facilitate problem resolution, monitor server effectiveness, and assist analysis of collective problems. The server 108 can maintain the analysis data 300 in an organized fashion. In one embodiment, the server 108 deletes analysis data 300 upon resolution of the problem. Alternately, the server 108 compiles the analysis data 300 according to how problems were resolved.

Continued long term storage of analysis data 300 can be costly and resource intensive. Numerous embodiments maintain and/or expunge analysis data 300 stored on the server 108. Removing older analysis data 300 regularly, preferably to tertiary storage, mitigates storage and maintenance concerns. In an embodiment, the server limits any single upload size. In an embodiment, the server 108 has a rolling storage system where only the most recent analysis data 300 from the user 300 is stored. The storage capacity of the server 108 can be actively monitored in case of spikes in transmissions. Further, where user 100 selects to transmit log data, repository maintenance prevents users from disrupting service by transmitting impromptu analysis data.

Alternate embodiments include, the directory having three basic interfaces including, a browse, a search and a retrieval interface. The browse interface provides the ability to browse user names and files using the underlying directory structure. This interface is ideal for finding transmitted analysis data 300 when the user name is known. The search interface provides the ability to find analysis data based on a user name string with an optional time range. In one embodiment, the user name string includes wildcards (for example, to find all users, starting with the first three letters "foo*"). The result of the search is a list of matching user names that meet the search criteria. The retrieval interface is displayed when a user name is selected, either from the browse or search interface. This interface shows a list of timestamps 404 representing each unique analysis data 300 from the client 104 invoked from a user 100. Each timestamp 404 can be a hyperlink to the list of files, from which the user 100 clicks to view or download the file.

In another embodiment, the directory contains an interface that notes the problem solved and the result obtained for each upload. This interface is ideal for searching the contents of the directory for the frequency of certain problems and the manner of their subsequent resolution. This interface facilitates problem prevention by permitting an overall analysis of problem management efficiency and efficacy.

In one embodiment the user receives notification that a problem was detected on the client 104 or device 102 either by the client 104 or the server 108, that analysis data 300 has been transmitted to the server 108, the results of any automatic analysis data analysis, and, if necessary, the need to seek live assistance by calling the provider, or customer support offered by the provider, and is provided with the contact information of the provider.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature.

I claim:

1. A method for resolving an error on a user device being used by a user to access a service provided by a service provider server, comprising:
   detecting, at the service provider server, a first error at a first user device, the first error occurring at a first time when the first user device is accessing the service provided by the service provider server;
   receiving, at an analysis server, user device analysis data captured on the first user device;
   receiving, at the analysis server, service provider server analysis data gathered on the service provider server that the first user device was accessing at the first time when the first error occurred, the service provider server analysis data being collected on the service provider server during a predetermined time period surrounding the first time when the first error occurred;
   responsive to the detection of the first error at the first user device, analyzing at the analysis server the user device analysis data together with the service provider server analysis data; and
   based on the combined analysis of the user device analysis data and the service provider server analysis data, identifying a resolution to the error.

2. The method of claim 1, further comprising:
   automatically detecting the first error using the analysis server.

3. The method of claim 1, wherein:
   receiving user device analysis data comprises copying a client file from the first user device and copying a device file from the first user device; and
   receiving service provider server analysis data comprises copying a server file from the service provider server.

4. The method of claim 1, further comprising:
   receiving the user device analysis data in encrypted form; and
   decrypting the analysis data prior to analyzing the user device analysis data together with the service provider server analysis data.

5. The method of claim 1, wherein the user device analysis data includes information relating to a plurality of related client devices, the first error effecting at least one of the related client devices.

6. The method of claim 5, wherein the user device analysis data is received from one of the plurality of related client devices.

7. The method of claim 1, further comprising:
   identifying, at the analysis server, instabilities that could lead to the first error.

8. The method of claim 1, wherein receiving service provider server analysis data gathered further comprises receiving service provider server analysis data gathered at the first time when the first error was occurred.

9. The method of claim 1, wherein the analysis server is the service provider server.

10. The method of claim 1, wherein the analysis server is distinct from the service provider server.

11. A method for resolving an error on a user device being used by a user to access a service provided by a service provider server, comprising:
    detecting, at the service provider server, a first error at a first user device, the first error occurring at a first time when the first user device is accessing the service provided by the service provider server;
    receiving, at an analysis server, user device analysis data captured on the first user device;
    receiving, at the analysis server, service provider server analysis data gathered on the service provider server that the first user device was accessing at the first time when the first error occurred, the service provider server analysis data being collected on the service provider server during a predetermined time period surrounding the first time when the first error occurred;
    responsive to the detection of the first error at the first user device, analyzing at the analysis server the user device analysis data together with the service provider server analysis data; and
    sending a result of the combined analysis of the user device analysis data and the service provider server analysis data to the first user device.

12. The method of claim 11, further comprising:
    based on the combined analysis of the user device analysis data and the service provider server analysis data, identifying a resolution to the first error.

13. The method of claim 11, wherein receiving service provider server analysis data gathered comprises receiving service provider server analysis data gathered at the first time when the first error occurred.

14. The method of claim 11, wherein the analysis server is distinct from the service provider server.

15. An analysis server for analyzing errors that occur when a user uses a user device to access service provided by a service provider server, comprising:
    a processor;
    a storage device, accessible by the processor, and configured to store user device analysis data from a first user device and service provider server analysis data from the service provider server; and
    a network interface, accessible by the processor, configured to facilitate communication with a service provider server and first user device; wherein the service provider server detects a first error at the first user device, the first error occurring at a first time when the first user device is accessing the service provided by the service provider server, and wherein:
    the processor is configured to receive the user device analysis data captured by the first user device;
    the processor is configured to receive service provider server analysis data captured, during a predetermined period of time surrounding the first time when the first error occurred, by the service provider server that the first user device was accessing at the first time;

the processor is configured to, responsive to the detection of the first error, analyze the user device analysis data together with the service provider server analysis data; and the processor is configured to identify a resolution to the first error based on the combined analysis of the user device analysis data and the service provider server analysis data.

16. The analysis server of claim 15, wherein:

the user device analysis data includes information about a client running on the first user device and information regarding the first user device.

17. The analysis server of claim 16, wherein the information about the client includes at least one of a version of the client, an update history of the client, a usage history of the client, and a usage history of service provider sites the client was used to access.

18. The analysis server of claim 16, wherein information regarding the first user device includes at least one of an inventory of hardware for the device, an inventory of software for the device, an inventory of device drivers for the device, an operating system for the device, a storage utilization level for the device, a memory utilization level for the device, and a processor utilization level for the device.

19. The analysis server of claim 15, wherein:

the service provider server analysis data includes information about the service provider server, the information about the service provider server including at least one of an inventory of hardware for the service provider server, an inventory of software for the service provider server, an inventory of device drivers for the service provider server, an operating system for the service provider server, a storage utilization level for the service provider server, a memory utilization level for the service provider server, and a processor utilization level for the service provider server.

20. The analysis server of claim 15, wherein:

the service provider server analysis data includes information about a communication network between the service provider server and the first user device, the information about a communication network between the service provider server and the first user device including at least one of an available bandwidth, a network utilization, an upload rate, and a download rate.

21. The analysis server of claim 15, wherein:

the user device analysis data is received in encrypted form; and the processor is further configured to decrypt the analysis data.

22. The analysis server of claim 15, wherein the user device analysis data includes information related to a plurality of user devices.

23. The analysis server of claim 15, wherein the processor is further configured to continuously monitor the first user device and automatically detect the first error.

24. The analysis server of claim 15, wherein the processor is further configured to transmit a copy of the service provider server analysis data to the first user device.

25. The analysis server of claim 15, wherein the processor is further configured to automatically remedy the cause of the first error.

26. The analysis server of claim 15, wherein the processor is further configured to notify a service provider of the first error.

27. The analysis server of claim 15, wherein the service provider server analysis data is captured at the first time when the first error occurred.

28. The analysis server of claim 15, wherein the analysis server is distinct from the service provider server.

29. A system for analysis of errors that occur when a user accesses with a user device a service from a service provider server, the system comprising:

an analysis server, a storage device, accessible by the analysis server, and configured to store user device analysis data from a first user device and service provider server analysis data from the service provider server; and a network interface, accessible by the analysis server, configured to facilitate communication with a service provider server and the first user device; wherein the service provider server detects a first error at the first user device, the first error occurring at a first time when the first user device is accessing the service provided by the service provider server, and wherein:

the analysis server is configured to receive from the first user device the user device analysis data captured by the first user device;

the analysis server is further configured to receive the service provider server analysis data captured, during a predetermined period of time surrounding the first time when the first error occurred, by the service provider server that the first user device was accessing at the first time;

the analysis server is further configured to, responsive to the detection of the first error, analyze the user device analysis data together with the service provider server analysis data; and the analysis server is further configured to send a result of the analysis to the first user device.

30. The system of claim 29, wherein:

the user device analysis data includes information about a client running on the first user device information about the first user device.

31. The system of claim 30, wherein information about the client includes at least one of a version of the client, an update history of the client, a usage history of the client, and a usage history of service provider sites the client was used to access.

32. The system of claim 30, wherein information about the first user device includes at least one of an inventory of hardware for the device, an inventory of software for the device, an inventory of device drivers for the device, an operating system for the device, a storage utilization level for the device, a memory utilization level for the device, and a processor utilization level for the device.

33. The system of claim 29, wherein:

the service provider server analysis data includes information about the service provider server, the information about the service provider server including at least one of an inventory of hardware for the service provider server, an inventory of software for the service provider server, an inventory of device drivers for the service provider server, an operating system for the service provider server, a storage utilization level for the service provider server, a memory utilization level for the service provider server, and a processor utilization level for the service provider server.

34. The system of claim 29, wherein:

the service provider server analysis data includes information about a communication network between the service provider server and the first user device, the information about a communication network including at least one of an available bandwidth, a network utilization, an upload rate, and a download rate.

35. The system of claim 29, wherein:
the user device analysis data is received in encrypted form; and
the analysis server is further configured to decrypt the user device analysis data.

36. The system of claim 29, wherein the user device analysis data includes information related to a plurality of user devices.

37. The system of claim 29, wherein the analysis server is further configured to continuously monitor the first user device and automatically detect the first error.

38. The system of claim 29, wherein the analysis server is further configured to automatically remedy the cause of the first error.

39. The system of claim 29, wherein the analysis server is further configured to notify a service provider of the first error.

40. The system of claim 29, wherein the service provider server analysis data is captured at the first time when the first error occurred.

41. The system of claim 29, wherein the analysis server is the service provider server.

42. The system of claim 29, wherein the analysis server is distinct from the service provider server.

* * * * *